US005520125A

United States Patent [19]
Thompson et al.

[11] Patent Number: 5,520,125
[45] Date of Patent: May 28, 1996

[54] COMBINATION CULTIVATOR AND CHEMICAL APPLICATOR

[75] Inventors: Warren L. Thompson, Elkhart; Philip D. Cox, Urbandale, both of Iowa

[73] Assignee: Deere & Company, Moline, Ill.

[21] Appl. No.: 333,469

[22] Filed: Nov. 2, 1994

[51] Int. Cl.⁶ ..................................................... A01C 5/00
[52] U.S. Cl. ........................................ 111/120; 172/724
[58] Field of Search ............................ 111/52, 120, 121, 111/122, 144, 164, 170, 194, 924; 172/142, 176, 177, 575, 724, 725

[56] References Cited

U.S. PATENT DOCUMENTS

| | | |
|---|---|---|
| D. 275,957 | 10/1984 | Sterrett . |
| 3,055,322 | 9/1962 | Oehler et al. .................. 111/52 X |
| 3,130,694 | 4/1964 | Gatzke ............................ 111/120 |
| 3,799,079 | 3/1974 | Dietrich . |
| 4,445,445 | 5/1984 | Sterrett . |
| 4,461,355 | 7/1984 | Peterson et al. . |
| 4,506,609 | 3/1985 | Fuss et al. ..................... 111/52 X |
| 4,560,011 | 12/1985 | Peterson et al. . |
| 4,574,715 | 3/1986 | Dietrich, Sr. et al. . |
| 4,596,199 | 6/1986 | Dietrich, Sr. et al. . |
| 4,628,840 | 12/1986 | Jacobson . |
| 4,656,957 | 4/1987 | Williamson et al. . |
| 4,723,495 | 2/1988 | Dietrich, Sr. et al. . |
| 4,742,785 | 5/1988 | Kolk et al. .................... 111/52 X |
| 4,762,181 | 8/1988 | Cox . |
| 4,819,737 | 4/1989 | Frase . |
| 4,834,189 | 5/1989 | Peterson et al. . |
| 4,872,412 | 10/1989 | Zollinger . |
| 4,947,770 | 8/1990 | Johnston . |
| 5,161,472 | 11/1992 | Handy ........................... 172/724 X |

OTHER PUBLICATIONS

Kinze Manufacturing, Inc., Kinze Model 1500 Conservation Cultivators, 6 pages and front and back covers, dated Aug. 1992, Published in the U.S.A.

Deere & Co., Cultivators and Hoes, 16 pages, dated Aug. 1994, Published in the U.S.A.

*Primary Examiner*—Terry Lee Melius
*Assistant Examiner*—Robert Pezzuto

[57] ABSTRACT

A rig assembly on a combination row crop cultivator and chemical applicator includes a knife or other applicator device supported in front of the cultivator sweep and behind the disk coulter blade. The sweep helps seal the chemical in the ground in certain soil conditions to prevent chemical loss, particularly when additional closing structure is not in use. A selectively attachable, shank-mounted closing mechanism, preferably a press wheel, may be mounted directly behind the sweep to assure a good chemical seal. Disk coulter support straps have flanges that provide a conveniently accessed mount for the applicator device and present minimal interference to trash and soil flow. A simple bracket connects an arm on the closing wheel mechanism to a central portion of the sweep standard. Numerous combinations of tools and tool mounting arrangements and adjustments are facilitated by the rig construction.

21 Claims, 3 Drawing Sheets

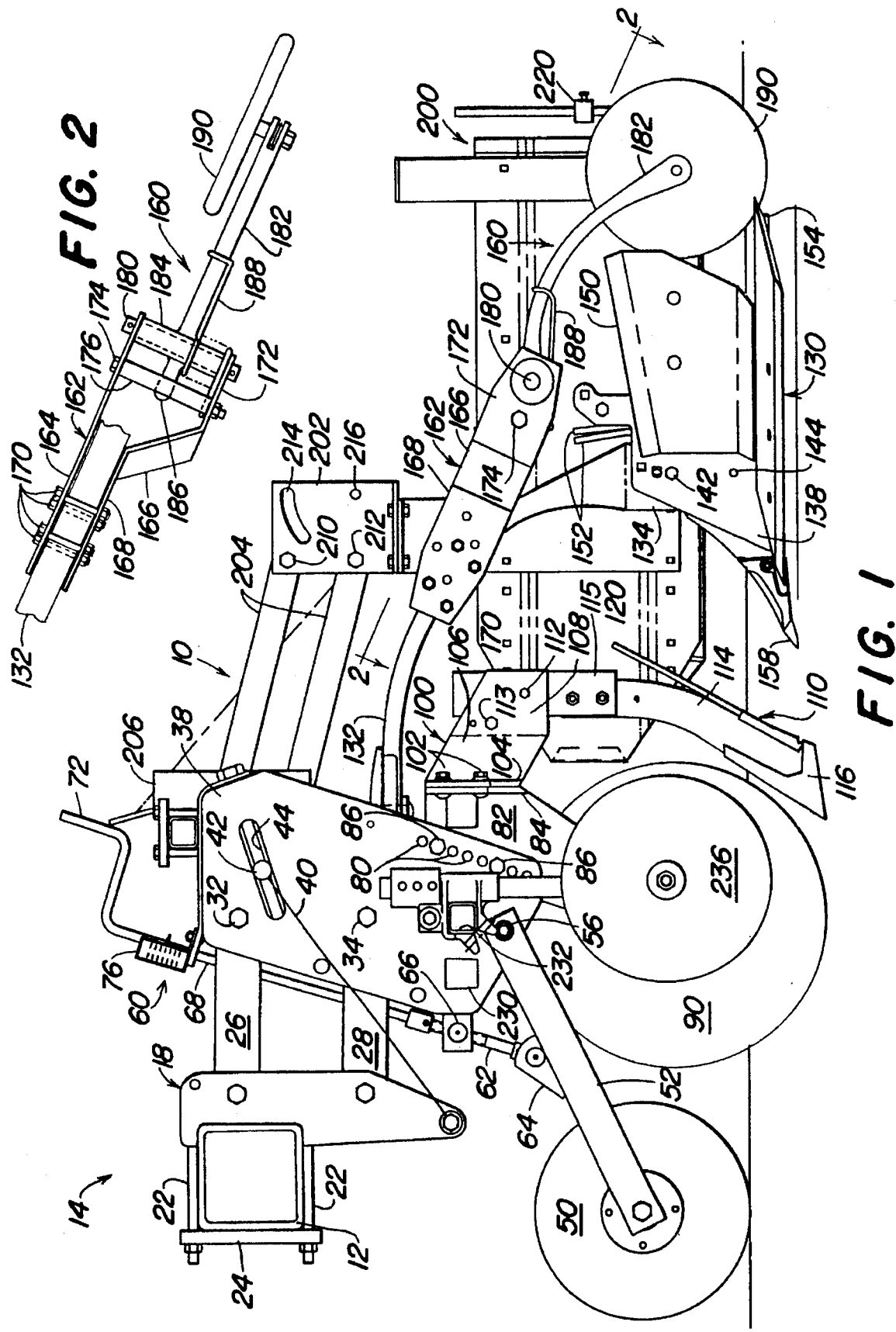

COMBINATION CULTIVATOR AND CHEMICAL APPLICATOR

BACKGROUND OF THE INVENTION

1) Field of the Invention

The present invention relates generally to agricultural equipment, and, more specifically, to a combination cultivating and chemical applicator device which is particularly useful for anhydrous ammonia application during row crop cultivation.

2) Related Art

Often, a farmer desires to apply a chemical such as anhydrous ammonia while cultivating a crop. Problems arise in such an operation because the chemical must be sealed in the ground. Proper sealing usually requires that a closing mechanism be mounted on the cultivator rig. Commonly, the mounting location for the chemical applicator, which is typically an anhydrous knife, is behind the cultivator sweep. However, there is no convenient location to attach a closing mechanism with such an arrangement. Also, the location of the knife behind the sweep adversely affects the weight distribution of the implement by shifting the center of gravity rearwardly. Attaching different combinations of tools to the rig and adjusting the depth of the various tools can often be inconvenient and time consuming, and some mounting arrangements limit trash clearance so that blockages occur more easily in heavy residue conditions. In certain soil conditions wherein closing attachments are deemed unnecessary, there is opportunity for the chemical to escape because of lack of proper sealing.

BRIEF SUMMARY OF THE INVENTION

It is therefore an object of the present invention to provide an improved chemical applicator and cultivation device for an implement such as a row crop cultivator. It is another object to provide such a device which overcomes most or all of the abovementioned problems. It is a further object to provide such an improved device which utilizes the cultivation tool to help seal the applied chemical in the soil.

It is another object to provide a chemical applicator and cultivation device which has a convenient mounting for a closing wheel or similar structure for more complete sealing of a chemical such as anhydrous ammonia in the soil.

It is yet another object to provide an improved chemical applicator and row crop cultivator device. It is a further object to provide such a device which shifts the center of gravity of the implement forwardly compared to at least many previously available row crop cultivators with chemical applicators.

It is a further object of the present invention to provide a chemical applicator and cultivation device wherein convenient mounting of a closing wheel or other sealing device is facilitated and wherein the cultivation tool is utilized to help seal the chemical in the soil. It is still another object to provide such a structure which is convenient to adjust and has a wide range of relative tool locations. It is yet another object to provide such a device which includes a coulter and an injection knife which may be adjusted together and which provide increased trash clearance as compared with many previously available applicator and cultivation devices.

A combination row crop cultivator and chemical applicator constructed in accordance with the teachings of the present invention includes a cultivator rig assembly having a knife or similar applicator device supported in front of the cultivator sweep or ground working tool and behind the disk coulter blade. A closing mechanism, preferably a press wheel, is selectively mounted on the shank which supports the sweep for rotation directly behind the sweep in cultivated soil to assure good sealing of the chemical.

The disk coulter blade is carried on support straps which have mounting flanges located above and rearwardly of the blade for attaching the applicator device. The mounting arrangement facilitates one-step adjustment of the applicator and the coulter and provides improved trash clearance. The rig includes an adjustable depth control located closely adjacent the mounting flanges having an easily accessed crank adjustment located above the rig.

By locating the knife or other applicator device between the coulter and the sweep, mounting of the closing mechanism is facilitated. The locations of the knife and disk move the center of gravity of the rig forwardly for better implement weight distribution. Locating the sweep behind the applicator device helps cultivated soil seal the chemical in the ground and is particularly useful in certain soil conditions for reducing chemical loss when no additional closing mechanism is attached to the rig. The mounting arrangement provides a wide range of depth adjustments and numerous tool combination possibilities, and adjustments of relative tool locations are easily accommodated. The location of the attaching flanges provides easy access for attaching or removing the applicator device as desired. The shank mounting arrangement is simple, inexpensive and versatile, and mounts the closing structure equally well to a variety of shanks. The closing structure may be attached or removed easily as soil conditions dictate.

These and other objects, features and advantages of the present invention will become apparent to one skilled in the art upon reading the following detailed description in view of the drawings.

BRIEF DESCRIPTION OF THE DRAWINGS

FIG. 1 is a side view of cultivator rig constructed in accordance with the teachings of the present invention and connected to the tool bar of a row crop cultivator.

FIG. 2 is view of the closing wheel structure on the rig taken generally along lines 2—2 of FIG. 1.

DETAILED DESCRIPTION OF THE DRAWINGS

Figure 3:
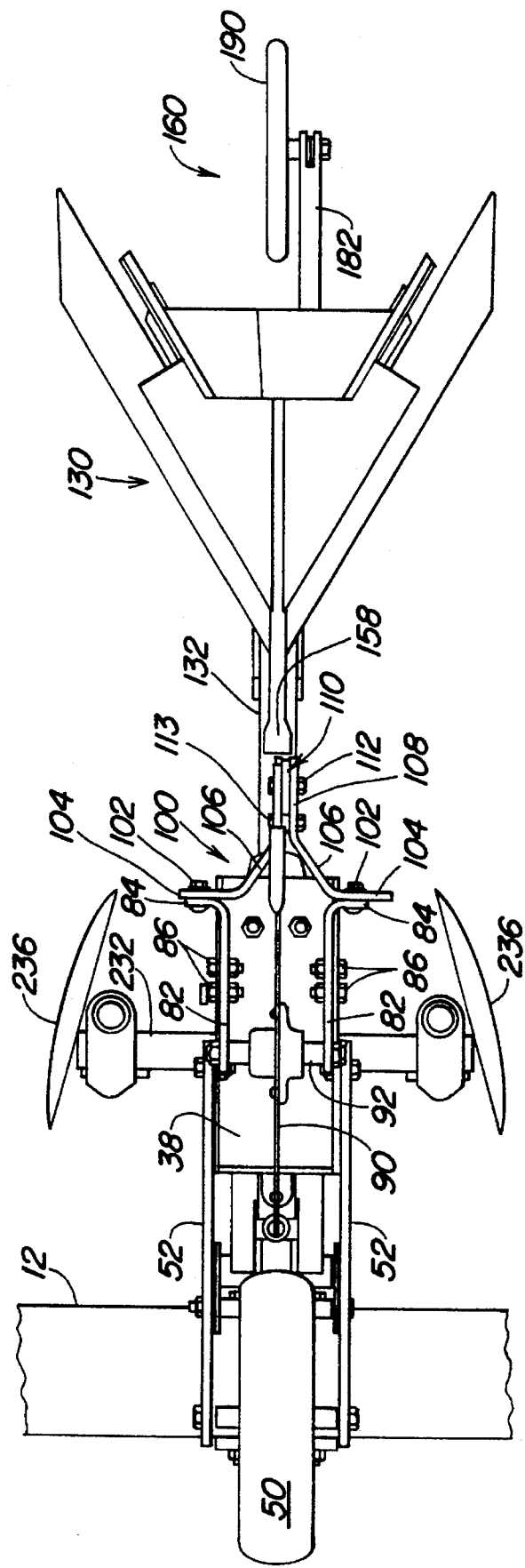
FIG. 3 is a bottom view of a portion of the rig shown in FIG. 1.

Referring now to FIG. 1, therein is shown a cultivator rig 10 connected to a transverse tool bar 12 of a row crop cultivator 14. The cultivator 14 is supported from a hitch (not shown) of a tractor for forward movement over the ground in a field planted in transversely spaced parallel rows. A plurality of the rigs 10 are transversely spaced on the tool bar 12 and are adapted for tilling the soil between the rows.

Each rig 10 includes main tool bar brackets 18 supported on the aft face of the bar 12 by bolts 22 and plates 24. Upper and lower parallel rig links 26 and 28, which are channel shaped and open downwardly, are pivotally connected at their forward ends to the brackets 18 and extend rearwardly to pivotal connections 32 and 34 with upright support structure 38 which extends downwardly on either side of the lower link 28. Down-pressure springs 40 are tensioned between the lower ends of the brackets 18 and an adjustable tensioning device 42 movably supported in slots 44 located in the sides of the upper rear portion of the support structure 38. The above-described link support and down-pressure structure is generally of the type which is commercially available on the John Deere 885 No-Till/Ridge-Till Cultivator.

A rig gauge wheel 50 is supported between the lower forward ends of a pair of fore-and-aft extending gauge wheel arms 52 for rotation about a transverse axis located below the toolbar 12. The upper aft ends of the arms 52 are pivotally connected at locations 56 to the opposite sides of the support structure 38. Rig depth adjusting structure 60 is connected between the support structure 38 and the central portion of the wheel arms 52 for adjusting the vertical position of the gauge wheel 50 relative to the support structure. The adjusting structure 60 includes a bolt 62 pivotally connected at its lowermost end to a centrally located arm bracket 64 and threaded upwardly through a turnbuckle 66 located near the lower forward end of the support structure 38. An upright crank 68 includes a lower end pinned to the top of the bolt 62 and an upper end rotatably supported from the top of the support structure 38 by a bracket 70. A crank handle 72 is located above the bracket 70 for turning the bolt 62 in the turnbuckle 66 to pivot the arm 52 and raise or lower the wheel 50. A scale 76 located adjacent a pointer on the upper end of the crank 68 provides a visual indication of the depth setting.

The sides of the support structure 38 are apertured at locations 80 near the lower rear edges for adjustably mounting apertured upright disk support straps 82. The straps 82 are substantially planar with outwardly extending flanges 84 (FIG. 3) located at the rear extremity of the straps. Bolts 86 which extend through a selected pair of the apertures 80 and through corresponding apertures in the leading edges of the straps 82 secure the straps to the inside surfaces of the sides of the support structure 38. The straps 82 extend downwardly from the lower rear edge of the support structure 38, and a disk coulter 90 is supported for rotation by a transverse axle 92 located below and generally aligned with the pivotal locations 32, 34 and 56. The axle 92 is supported in one of a plurality of pairs of apertures 94 (see FIG. 4) located at the lower ends of the straps 82.

A chemical applicator mounting bracket 100 is secured to the flanges 84 of the disk support straps 82 by bolts 102 at an easily accessibly location behind the support structure 38 and above the upper rear extremity of the disk coulter 90. As shown in FIGS. 1 and 3, the mounting bracket 100 includes opposed apertured flanges 104 which align with and are secured against the flanges 84 by the bolts 102. The bracket 100 includes rearwardly converging upright sections 106 terminating in transversely spaced upright applicator-receiving sections 108. A chemical applicator tool 110 is connected to the sections 108 by a shear bolt 112 and by a stop bolt 113 which contacts the leading edge of the tool 110 to hold the tool against rotation in the counter-clockwise direction (as viewed in FIG. 1) about the bolt 112. As shown in the figures, the tool 110 is an anhydrous ammonia knife 114 having a shank 115 which extends downwardly from the bracket 100. The knife 114 angles forwardly at a central location towards the coulter 90 to support a point 116 closely adjacent the lower rear portion of the coulter and at approximately the same level as the bottom of the coulter. A tube 120 connected to a chemical supply tank extends downwardly at the rear of the shank to an outlet located behind the point 116. As best seen in FIG. 3, the bracket 100 connects the tool 110 to the support straps 82 and generally aligns the tool with the coulter 90.

An earthworking tool 130, shown as a conservation sweep in FIG. 1, is supported directly behind the tool 110 by a shank 132. The upper forward end of the shank 132 is connected to the support structure 38 at a location above the straps 82 and extends rearwardly and downwardly to a narrowed and substantially upright tool-receiving end 134. The sweep 130 includes apertured side mounting plates 138. A bolt 140 extending through a selected set of apertures in the plates 138 and a corresponding aperture in the end 134, along with lower pin 144, secure the sweep 130 to the shank 132. The angle of the sweep 130 may be varied by inserting the bolt 142 through a different set of apertures. A ridging attachment 150 is supported over the rear edges of the sweep wings. Optional liquid fertilizer tubes 152 are shown for depositing fertilizer behind the sweep 130 at one or more locations along the back edge of each of the sweep wings, including an outermost wing location indicated generally at 154 in FIG. 1. The sweep 130 includes a point or tip 158 which trails directly behind the tool 116 and is aligned with the coulter 90 and the tool 116. Preferably, the point 158 is chisel-shaped angling downwardly in the forward direction (see FIGS. 1, 3 and 4), and is located a couple of inches above the point 116 and slightly above the point of entry of the chemical into the soil from the outlet of the tube 120. The tool 130 works the soil behind the tool 116 and provides some sealing of the chemical applied by the tool 116.

Closing structure, indicated at 160 in FIGS. 1–3, is selectively attachable to the central portion of the shank 132 (as well as the shank 132a of FIG. 4) by a simple closing structure bracket 162. The bracket 162 includes a right-hand (as viewed from the rear in the forward direction) planar side plate 164 with a forward apertured portion which abuts the right side of the shank 132. A mating angled plate 166 includes a forward apertured section which abuts the left side of the shank 132 opposite the plate 164, and two pairs of bolts 170 pass through selected pairs of the plate apertures above and below the shank 132 to rigidly connect the plates 164 and 166 to the shank. The plate 166 diverges in the rearward direction (FIG. 2) and then angles rearwardly to a rear apertured support area 172 opposite a similar apertured area at the rear of the plate 164. A bolt 174 extends through apertures in the plates, and a spacer 176 supported on the bolt 174 between the plates maintains a preselected plate spacing and also acts as a down limit stop for the closing structure 160.

The closing structure 160 is pivotally connected by a pin 180 to the aft ends of the plates 164 and 166 behind the spacer 176 for rocking about a transversely extending axis. The closing structure 160 includes an arm 182 extending downwardly and rearwardly from a journal area 184 pivotally mounted between the plates 164 and 166 by the pin 180. A contact extension 186 (FIG. 2) projects forwardly from the journal area 184 to a location below the spacer 176 to contact the spacer and limit downward rocking of the arm 182. A torsion spring 188 encircles one side of the journal area 184 and bears against the top of the arm 182 to provide downward bias. An additional spring (not shown) may be provided on opposite side of the arm 182 to increase closing structure down-pressure if necessary. A relatively narrow closing wheel 190 is rotatably mounted on the lower aft end of the arm 182 for rotation, preferably about a generally transverse and horizontal axis, in alignment with the coulter 90 and the tool 116. The wheel 190 firms the cultivated soil directly over the area where the tool 116 has applied chemical to further seal that chemical in the soil. As shown, the wheel 190 has a width which is slightly larger than the width of the chemical applicator tool 110 so there is minimal disturbance of the cultivated soil and good forming of the soil over the area of chemical injection.

As shown in FIG. 1, the rig 10 also includes shield structure 200 connected by a reversible bracket 202 to the aft ends of a parallel linkage 204. The forward ends of the parallel linkage 204 are pivotally connected to the rig by bracket structure 206 adjacent one side of the support structure 38. As shown, the bracket 202 is secured to the linkage 204 by upper and lower pivot bolts 210 and 212 to maintain the shield structure in a level attitude for good plant protection. If trash and crop conditions warrant, the bracket 202 can be reversed so that the bolt 210 extends through a slot 214 and the bolt 212 is inserted through a hole 216 thereby permitting the shield structure 200 to trip and pivot about the bolt 212 in the counter-clockwise direction if a blockage is encountered. A spray tip mount 220 is supported at the aft end of the shield structure 200. Rectangular apertures 230 are provided in the support structure 38 to mount transverse tube structure such as shown at 232 in FIGS. 1 and 3 for accommodating additional tools such as hilling or barring off disks 236 outwardly adjacent the coulter 90.

Figure 4:
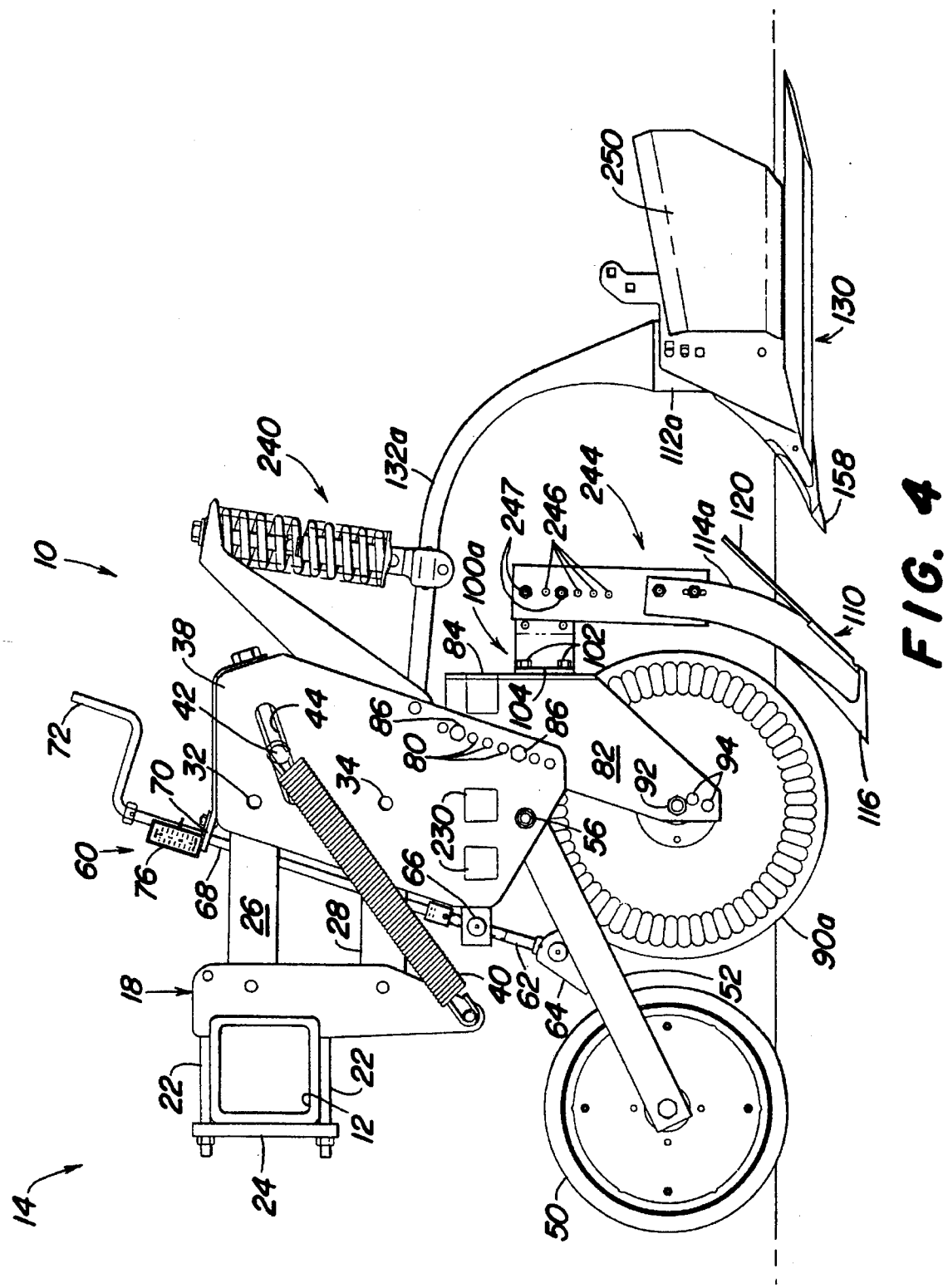
FIG. 4 is a side view of an alternate embodiment of a cultivator rig with a spring trip standard and with the closing wheel structure removed.

In the embodiment shown in FIG. 4 (wherein components which are similar but not identical in construction to those shown in FIG. 1 are indicated by the suffix "a"), a spring trip assembly 240 connects the shank 132a to the support structure 38 and no closing structure is provided. A modified bracket 244 with vertically spaced hole locations 246 is adjustable for numerous combinations of relative tool/coulter locations. The tool 110 is adjusted vertically by placing bolts 247 through selected sets of the hole locations 246 so that the point 116 is approximately level with the bottom of the coulter 90a. The straps 82 are positioned using the bolts 86 and apertures 80 so that the bottom of the coulter 90a and the tip 116 are located below the tip 158 of the trailing sweep 130 by about 2 inches. As the coulter 90a wears, the location of the axle 92 can be shifted to a different pair of apertures 94 to compensate for reduced coulter diameter. Replaceable plastic covers 250 are attached to the ridging wings 150 for improved wear and soil/residue flow. The shank 132a may have a different curvature than the shank 132 of FIG. 1, but if attachment of the closing structure 160 is desired, the additional hole patterns in the plates 164 and 166 assure a good, sturdy fit between the bracket structure 162 and the shank.

In operation, the toolbar 12 is lowered to the field-working position shown in FIG. 1, and the tools on the rig 10 penetrate the soil to a depth dependent on the setting of the gauge wheel 50. The coulter 90 penetrates the soil to slice residue, to open a slit for the trailing applicator tool 110, and to provide rig stabilization. Chemical from the tube 120 is injected behind the tool point 116. Immediately after the chemical is injected, the sweep 130 works the soil between the rows of crop and over the chemical to provide some sealing. When the closing structure 160 is attached, the closing wheel 190 firms the cultivated soil over the area where the chemical was injected to further seal the area against chemical loss.

Having described the preferred embodiment, it will become apparent that various modifications can be made without departing from the scope of the invention as defined in the accompanying claims.

We claim:

1. A combination tillage and chemical applicator structure for an implement having a transversely extending frame member adapted for forward movement over the soil for cultivating the soil and applying a chemical beneath the surface of the soil, the structure comprising:

a disk;

tool support structure connected to the frame member and vertically movable with respect to the frame member;

a disk support connected to the tool support structure and adjustable vertically with respect to the tool support structure, the disk support supporting the disk for rotation in the soil to cut an opening in the soil in an area around the disk;

an adjustable depth control connected to the tool support structure for maintaining the disk at a preselected operating depth;

a chemical tool connected to the disk support and supported immediately behind the disk for movement through the area and depositing a chemical in the area at a depth dependent on the preselected operating depth of the disk and the vertical adjustment of the disk support relative to the tool support structure;

wherein the chemical tool is vertically adjustable with the disk support to thereby facilitate simultaneous adjustment of the chemical tool and the disk with respect to the tool support structure; and sealing structure supported behind the chemical tool and sealing the deposited chemical.

2. The invention as set forth in claim 1 including a shank having an upper end connected to the tool support structure and extending rearwardly over the chemical tool and downwardly to a lower end supporting the sweep, wherein the sealing structure includes a chisel-shaped point aligned with the disk and the chemical tool.

3. A combination tillage and chemical applicator structure for an implement having a transversely extending frame member adapted for forward movement over the soil for cultivating the soil and applying a chemical beneath the surface of the soil, the structure comprising:

a disk;

tool support structure;

means pivotally connecting the tool support structure to the frame member for vertical movement relative to the frame member;

a vertically adjustable disk support connected to the tool support structure and supporting the disk for rotation in the soil to cut an opening in the soil in an area around the disk;

a chemical tool connected to the disk support and supported immediately behind the disk for movement through the area and depositing a chemical in the area, wherein the chemical tool is vertically adjustable with the disk support to thereby facilitate simultaneous adjustment of the chemical tool and the disk;

an earthworking tool supported from the frame member at a location behind the chemical tool for at least partially closing the area above the deposited chemical; and wherein the means connecting the tool support structure comprises a linkage having upper and lower fore-and-aft extending arms with forward and rearward ends, the forward ends connected to the frame and the rearward ends connected to the tool support structure;

gauge wheel structure connected to the tool support structure and controlling vertical movement of the tool support structure relative to the frame to thereby provide depth control for both the chemical tool and the disk, and wherein the tool support structure comprises upright structure extending from the lower arm, and the vertically adjustable disk support structure is connected to the upright structure and is retained in substantially a constant upright position by the linkage as the gauge wheel structure provides depth control.

4. The invention as set forth in claim 3 including a tool mounting bracket connected to the disk support structure, and wherein the chemical tool is connected to the tool mounting bracket and is vertically adjustable relative to the disk support structure.

5. The invention as set forth in claim 4 wherein the tool bracket is located above and rearwardly of the disk, and the disk is supported directly below the aft end of the linkage.

6. The invention as set forth in claim 3 including a shank connected to the tool support structure and extending rearwardly over the disk support, the shank terminating in a lower end located directly behind the chemical tool and connected to the earthworking tool.

7. The invention as set forth in claim 3 wherein the earthworking tool comprises a downwardly angled chisel-shaped tip aligned with the chemical tool for firming the soil over the chemical.

8. The invention as set forth in claim 7 wherein the earthworking tool includes wings extending outwardly from the tip and further comprising a tube extending rearwardly of the earthworking tool for applying a chemical adjacent the wings laterally outwardly of the chemical tool.

9. The invention as set forth in claim 6 including a closing wheel supported from the shank for rotation about a horizontal axis which extends substantially transverse to the forward direction.

10. The invention as set forth in claim 9 including a bracket connected to the shank above the earthworking tool and supporting the closing wheel.

11. The invention as set forth in claim 1 further comprising a fore-and-aft extending arm, the aft end of the arm pivotally connected to the lower end of the tool support structure adjacent the disk, wherein the depth control comprises a wheel rotatably mounted at the forward end of the arm forwardly of the disk, an adjustable length member connected between the upper end of the disk support structure and a portion of the arm between the forward and rearward ends, and a operator accessible device located above the tool support structure for adjusting the wheel vertically relative to the disk.

12. A combination tillage and chemical applicator structure for an implement having a transversely extending frame member adapted for forward movement over the soil for cultivating the soil and applying a chemical beneath the surface of the soil, the structure comprising:

a fore-and-aft extending and vertically moveable linkage connected to the frame member;

a vertically adjustable disk support extending downwardly from the aft end of the linkage;

an adjustable depth control wheel connected to the disk support;

a disk rotatably mounted on the disk support for rotation in the soil at a location offset in the fore and aft direction from the depth control wheel, wherein depth of penetration of the disk is dependent on adjustment of the depth control wheel;

a chemical tool supported immediately behind the disk on the disk support for movement through and depositing of a chemical in the soil behind the disk, wherein the chemical tool is vertically adjustable with the disk support to thereby facilitate adjustment of the chemical tool and the disk together and wherein operating depth of the chemical tool is also dependent on the adjustment of the depth control wheel;

a shank connected to the linkage for movement therewith, the shank having a lower tool-supporting end extending behind the chemical tool; and a sweep supported from the tool-supporting end rearwardly of the chemical tool for cultivating the soil and closing the area above the deposited chemical with cultivated soil.

13. The invention as set forth in claim 12 wherein the sweep includes a chisel-shaped tip supported directly behind the chemical tool.

14. The invention as set forth in claim 12 further comprising a closing wheel rotatable about a generally horizontal axis and aligned with the chemical tool.

15. The invention as set forth in claim 14 including a bracket connected to the shank above the tool-supporting end, and an arm pivotally connected to the bracket and supporting the closing wheel behind the sweep.

16. The invention as set forth in claim 12 wherein the sweep comprises a conservation sweep having a chisel-shaped tip located above the deposited chemical and wings extending transversely from the tip a substantial distance outwardly from the tip.

17. The invention as set forth in claim 12 wherein the disk support includes a vertically adjustable member for varying the relative vertical location of the disk and the linkage, and further comprising a bracket supporting the chemical tool from the vertically adjustable member so that the disk and chemical tool are adjustable in unison, and wherein the bracket includes means for adjusting the location of the chemical tool relative to the disk.

18. The invention as set forth in claim 17 wherein the chemical tool is bolted to the bracket and is adjustable vertically with the bracket.

19. The invention as set forth in claim 16 further comprising a ridging tool connect adjacent the sweep, and a plastic wear cover connected to the ridging tool.

20. The invention as set forth in claim 12 further comprising a shield, and a reversible shield bracket connecting the shield to the linkage, the shield bracket having a first position preventing rotation of the shield about a transverse axis, and a second position when reversed for permitting limited rocking movement of the shield.

21. The invention as set forth in claim 16 including a liquid fertilizer tube extending rearwardly of the wings to an outermost location for applying liquid fertilizer outwardly of the chemical tool.

* * * * *